United States Patent [19]

Kerwin

[11] Patent Number: 4,599,129

[45] Date of Patent: Jul. 8, 1986

[54] MACHINE AND METHOD FOR APPLYING MINIATURIZED INDICIA TO ARTICLES

[76] Inventor: Daniel Kerwin, 588 S. Stewart, Lombard, County of DuPage, Ill. 60148

[21] Appl. No.: 655,091

[22] Filed: Sep. 27, 1984

[51] Int. Cl.[4] ........................ B32B 31/00; B44C 1/00; B65H 26/00

[52] U.S. Cl. .................................... 156/361; 156/229; 156/366; 156/475; 156/495; 156/541; 156/DIG. 33; 101/33

[58] Field of Search ............... 156/230, 239, 240, 241, 156/540, 541, 542, 361, 277, 229, 366, 367, 450, 475, 495, DIG. 33, DIG. 40, 494; 101/76, 92, 34, 33; 242/156, 156.1

[56] References Cited

U.S. PATENT DOCUMENTS

| | | | |
|---|---|---|---|
| 3,117,048 | 1/1964 | Rechel | 156/494 |
| 3,813,268 | 5/1974 | Kerwin | 156/542 |
| 3,928,115 | 12/1975 | Kerwin | 156/542 |
| 3,984,276 | 10/1976 | Stuart | 156/475 |
| 4,084,501 | 4/1978 | Kerwin et al. | 101/76 |
| 4,248,652 | 2/1981 | Ciuardi et al. | 156/241 |
| 4,328,051 | 5/1982 | Robinette | 156/229 |
| 4,349,404 | 9/1982 | Changani et al. | 156/229 |
| 4,440,589 | 4/1984 | Lock | 156/240 |

FOREIGN PATENT DOCUMENTS

| | | | |
|---|---|---|---|
| 3143352 | 9/1982 | Fed. Rep. of Germany | 156/234 |
| 2456036 | 1/1981 | France | 156/495 |

*Primary Examiner*—Edward Kimlin
*Assistant Examiner*—Louis Falasco
*Attorney, Agent, or Firm*—Robert A. Brown

[57] ABSTRACT

This invention deals with a machine or method for transferring decalcomania (decals) from a rolled carrier web or strip to a series of articles. The machine supports a supply reel containing the web and transports the web from the supply reel through a photo sensitive indexing assembly, past a decal applying pressure roller assembly, to a take-up tensioning roller powered by a motor for driving the web. The photoelectric or other appropriate device actuates the release of a brake or other holding means from a web clamping position so that a decal on the web is placed in position for transfer to an article. The web tensioning mechanism is provided to hold the web under tension during application of a decal. A photo cell assembly may be operated to adjust the position of the web so that successive decals are precisely at the transfer position. In instances where an interleaf or backing strip is provided on the supply reel along with a web, the machine removes the interleaf before the web reaches the pressure roller assembly. The carrier web is adapted to transport preformed miniaturized irregular shapes that become full sized and regular in form upon being transferred to indicia receiving articles.

15 Claims, 6 Drawing Figures

FIG. 1
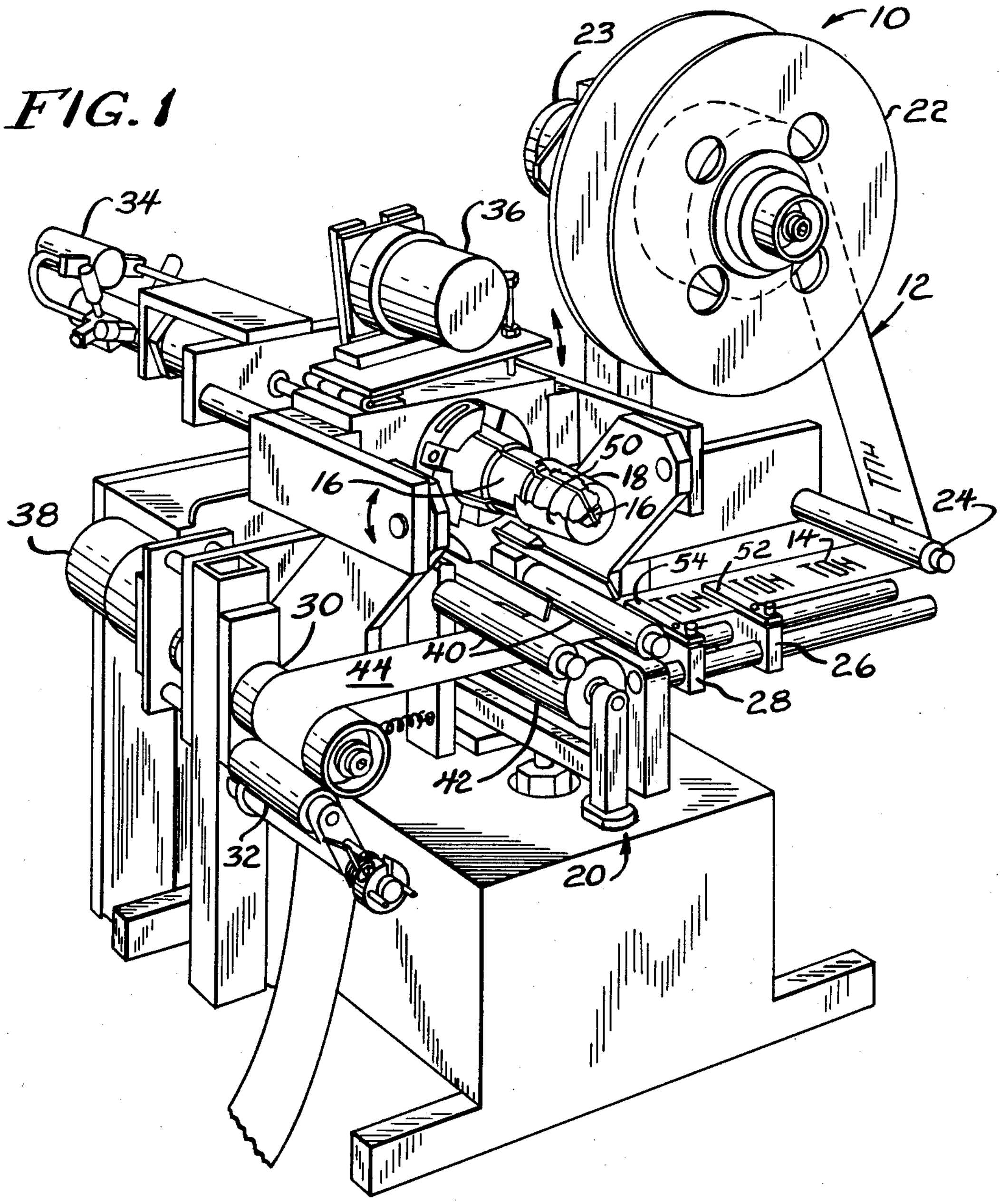
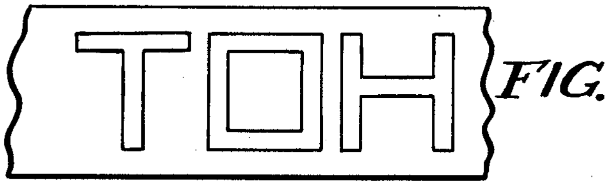
FIG. 2
PRIOR ART
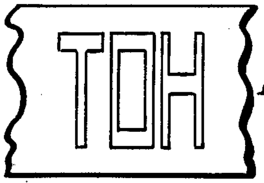
FIG. 3
FIG. 4
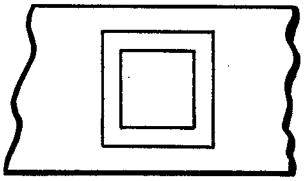
FIG. 5
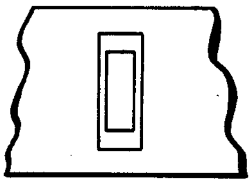
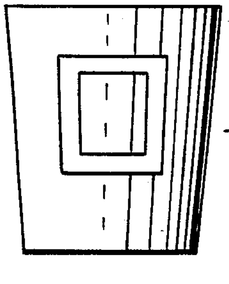
FIG. 6

MACHINE AND METHOD FOR APPLYING MINIATURIZED INDICIA TO ARTICLES

BACKGROUND OF THE INVENTION

The present invention relates generally to a machine or method for transferring decalcomania (decals) from a rolled carrier web or strip to a series of articles. In particular, this invention is concerned with decals that have been preformed into miniaturized, irregular shapes and upon being transferred to an article assume a fully developed, regular, desired configuration.

A great many prior art references show apparatus for transferring indicia in the form of labels or decals from a rolled web to an article. Illustrations depicting the manner in which a variety of solutions have been attempted to solve existing problems may be found in U.S. Pat. Nos. 3,813,268; 3,928,115; and 4,084,501.

For the most part these prior art machines transferred decorating decals to articles by the use of heat release means and improvements thereto resulted from the development of semiautomatic and automatic decal application machinery. Eventually, the state of the art progressed to the point where heat release decals were printed on a continuous web of paper for feeding through the machines and then transferring the decals to articles to make a finished product. However, a progressively increased use of heat release decals reached a plateau because of intensive competition from alternative methods of applying decorative designs to articles, such as direct screening, direct printing and the like. These alternative methods proved less expensive because of the high cost of placing decals on a web, especially in areas of high volume production.

The cost of decals is determined by a number of factors including the physical size of a decal, the quantity used in a production run and the number of different colors used in perfecting a decorative scheme or artistic layout of a decal.

Attempts to utilize the teachings of the aforementioned and other prior art patents have resulted in a number of difficulties. For example, no one has yet solved the problem of using excessive amounts of decal carrying paper. Also, there continues to be a problem in controlling loss of definition in alternative decorating methods when designs are directly screened, impressed, or imprinted upon an indicia receiving article. Placement of decals in series or consecutive order upon a web in preparation for running the web through the machine for transferring a decal to an article requires adequate spacing between each successive decal on the web so that the machine can be provided a sufficient linear interval in order to remove a decal from the web and apply it to an article. Thus, a large amount of expensive, specially treated decal carrying paper is used to achieve application of a minimum number of decals.

SUMMARY OF THE INVENTION

Accordingly, it is a primary object of the present invention to avoid excessive use of decal carrying paper or other similar means by devising an arrangement to increase the number of decals placed on a unit length of web and thereby reduce the cost of materials used in achieving a finished article.

It is a further object of the present invention to provide a finished article having imprinted thereon a decorative shape that is substantially larger than the decal taken from the web and affixed to the article.

An additional object of the present invention is to take a distorted configuration of decal from web carrying paper and upon application to an article have the decal assume an elongated shape.

A machine in accordance with the present invention comprises means for supporting a web supply or payout reel and brake, means forming a web transport path for transporting the web from the supply reel through the machine to drive means for moving the web, means for moving the web into contact with an article, means for causing a decal to assume a plastic condition, means for controlling the speed of movement of the article at a rate faster than that of the web, and means for transferring the decal from the web to the article in a manner whereby the decal is changed from an original, reduced length, distorted configuration to a final, elongated, regular configuration when affixed to the article.

BRIEF DESCRIPTION OF THE DRAWINGS

The foregoing and other characteristics, objects, features and advantages of the present invention will become more apparent upon consideration of the following detailed description, having reference to the accompanying figures of the drawings, wherein:

FIG. 1 is a frontal perspective view of a machine for applying decals to articles in accordance with the invention;

FIG. 2 shows a fragmented portion of a prior art web on which is located a sample of a decal having an original configuration equal in size to the shape of the decal after application to an article;

FIG. 3 shows a fragmented portion of a web on which is located a decal providing the same message or decorative display as shown in FIG. 2, but the characters of the decal have been distorted or squeezed into minimal space in preparation for transfer to an article.

FIG. 4 shows one of the characters of the message or decorative display seen in FIG. 3 depicting the ultimate size of the character after being applied or transferred to a conically shaped object.

FIG. 5 shows the character of FIG. 4 in its initial shape or form prepared for application to a web by having been subjected to distortion and miniaturization or made smaller so that a greater number of characters or decals can be placed on a given length of web.

FIG. 6 shows a conically shaped finished article after it has had transferred thereto the character shown in FIGS. 4 and 5 and showing the character having been returned to the shape and size of the original art work.

DESCRIPTION OF A PREFERRED EMBODIMENT OF THE INVENTION

Referring now to the drawings, there is shown generally a machine 10 for applying decalmania (decals), indicia or the like to articles for decoration thereof including a continuous web 12 of decal carrying material, such as paper or the like, a plurality of decals 14 affixed to the web, a mandrel 16 that supports an article or substrate 18 for receiving a decal and a pressure roller assembly 20 adaptable to apply force to and heat the web in order to transfer and permanently affix the decal to the article. The web is shown located on a pay out reel 22 movably controlled by a brake 23 and is threaded around a first guide roller 24 through a brake actuating photo cell assembly 26, past a clutch release photo cell assembly 28, through the pressure roller assembly 20, and further threaded around a drive roller 30, past a pinch roller or tensioning means 32, to a take-up reel (not shown) or other final disposal means.

A constant speed motor 36 causes the mandrel to rotate at a desirable velocity through a chain or other suitable power drive means connected therebetween. The mandrel is a type that expands and retracts, as controlled by a hydraulic control valve 34 or other electable means, for fitting within an article in rigid holding contact therewith for rotation at a desired number of revolutions per unit of time. A variable speed motor 38 is provided to operate the pressure roller assembly 20 through a pneumatic or other suitable control means to move the assembly 20 up and down in vertical rectilinear direction for a purpose hereinafter explained in more detail. The pressure roller assembly 20 comprises a plurality of pinch or guide rollers 40 and a pressure roller 42 that serve to guide and direct the indicia carrying web as it moves through the machine.

Travel of the web through the apparatus is controlled by the brake actuating photo cell assembly 26 and the clutch release photo cell assembly 28 whereby the web is held in a pre-selected position, caused to move upwardly by the pressure roller assembly 20 and maintained or held in that position so that contact between a decal and article can be achieved. During the time period that contact is maintained between the decal and the article, the mandrel 16 is rotating and the web 12 is moving in a rectilinear direction. After transfer of the decal to the article is complete, the pressure roller assembly 20 is moved downwardly and the web is withdrawn from the article leaving the decal firmly affixed to the article. At this moment, the mandrel is stopped from rotating and the web no longer moves rectilinearly. The web is then indexed to a new position for transferring the next decal to a subsequent article. The photo cell assembly 26 includes a start position register bar 52 and a stop position register bar 54 is disposed on photo cell 28 for sensing each successive decal as the web moves toward the pressure roller assembly.

The indicia receiving article or substrate 18, such as a glass tumbler, for example, is located in close proximity to a surface 44 of the web 12 whereon are located the plurality of decals 14. It shall be understood that the article is illustrative of but one of many different shapes and configurations that may be fed consecutively into the machine for having applied thereon an appropriate and specific type of decal. In this connection, the substrate or shaped articles may have a flat lineal surface, be spherical, conical, cylindrical in shape, or have any other desired type of geometrical configuration.

A device (not shown) for heating the pressure roller assembly 20 is disposed within the machine and is utilized to control the application of heat to the web between 100 degrees F. and 500 degrees F. depending upon the constituent make-up of the decal. By applying heat to the thermoplastic decal, it is possible to place it in a creamy, semi-liquid condition in preparation for application to an indicia receiving article. The creamy, semi-liquid state of the decal makes it possible to act as a lubricant between the web paper and the article or substrate as the web moves at a linear speed different from the rotating angular speed of the consecutively fed articles mounted on the mandrel. It should be noted that the tangential linear speed of the rotating substrate is greater than the linear speed of the decal carrying web.

Additionally, it should be understood that the relative speed between the angular velocity of the article rotating with the mandrel or the linear speed of a substrate and the linear speed of the web is a determining factor as to the initial dimensions of the decal and its ultimate dimensions after being transferred to an article. If the angular or linear velocity of the article is equal to the linear velocity of the web, the initial dimensions of the decal must be the same as the dimensions of the decal transferred to the article. If the angular or linear velocity of the article is four times the linear velocity of the web, the initial dimensions of the decal may be one quarter of its final size after transferral to an article. Accordingly, the "stretch" factor of a decal is dependent upon the relationship between angular or linear velocity of an article and the linear velocity of the web.

As the articles are fed into the machine and come into contact with the web at a linear speed greater than the linear speed of the web, the decals in their semi-plastic state are caused to elongate, distort or be stretched out when they are applied to a receiving surface of an article or substrate. In order to compensate for the distortion process that occurs during application of decals, the decals are made distorted in an opposite direction, so to speak, or compressed into a much shorter linear length of web per size of decal than has heretofore been accomplished. Thus, a greater number of decals may be located on a unit length of web with consequent large amounts of savings realized with respect to costs of raw materials and the like.

Referring particularly to FIG. 4, an illustration of artwork for decorating a conically shaped article is indicated and depicts the final full sized shape of a character of a decal as it would look after being applied to the conic surface of the article. FIG. 5 shows the initial shape of the decal character and a first step in the application procedure wherein the decal is distorted by "squeezing" it into a reduced length of preselected configuration for subsequent retilinear movement with the web. This distortion of the decal, of course, makes it much smaller in size than the final desired configuration on the finished article. When the miniaturized, distorted, smaller decal is applied or transferred by means heretofore described to an indicia receiving article, the decal is restored to and assumes a preselected size and shape, or configuration that corresponds to the size and shape desired on the article or substrate. In this manner it is possible to transfer decorative decals to flat surfaces, cylindrical surfaces, conical surfaces, protuberant and undulating surfaces and any other combination of geometrical generation of three dimensional surfaces.

There will now be described an entire cycle of operation wherein an operator first removes an article from a storage area (not shown) in which, in addition to web heating means, there may be provision for preheating the article to a temperature of approximately 250 degrees F. The operator then places the heated article on the mandrel of the machine and initiates operation of the process by moving a start switch 48 to an "on" position and depresses a reset button switch. This causes motor 38 to actuate drive roller 30 and begin pulling or moving the web 12 through the machine. The photo assembly 26 through appropriately connected electrical circuitry or other equivalent means sets the brake assembly 23 to stop the web and simultaneously stops motor 38 to hold the web at a preselected position. The operator then depresses a push button, foot pedal or other appropriate starting means which activates the pressure roller 42 to begin movement in a vertically upward direction. There is also initiated a timing operation that is associatively controlled by a number of components (not shown) including a pressure cylinder valve, a holding relay and a reset timer for photo cells 26 and 28. The timing operation is effective to permit the mandrel to rotate after the article comes into contact with the web moved by pressure roller 42.

The holding relay is effective to maintain the pressure roller assembly 20 in an upwardly extended position by means of photo cell 28. After movement of roller assembly 20 in an upward direction causes the web to contact the article on the mandrel, the brake 23 is released by action of photo cell 26. At this moment in time, the pressure roller assembly 20 has moved the web upwardly into contact with the article or substrate. After a pre-selected delay of time, the motor 36 begins operation and causes the mandrel 16 to rotate with the article 18 securely affixed thereto. The start switch causes the mandrel to expand within the article so that it is fixedly secured thereon for rotation therewith. As the pressure roller mechanism moves vertically, the elongated web comes into contact with an exterior surface 50 of the article. Rotation of the mandrel causes the article to revolve or rotate as a unit therewith. In simultaneous fashion, the brake assembly 23 releases its hold on the web, the pressure or pinch rollers 40 begin to turn and the web 12 moves linearly in contact with the rotating article secured on the mandrel. A number of factors serve to transfer the indicium from the web to the article, including but not limited to the size of the decal affixed to the web, the size of the article secured to the mandrel, the combined linear travel of the web and the rotative or linear speed of the article, as limited by the circumferential or straight length of the article. This transfer is facilitated due to contact between the article 18 and the web 12 that causes the decal indicium 14 to assume a plastic creamy, semi-liquid condition. As the article continues to rotate, in an opposite direction at the point of tangency with the direction of the web, the soft indicium is pressed against the article and because of its plastic condition is caused to elongate. As the movement of the article and web continues, the indicium is further elongated until such time as it is fully applied to the article. By controlling the relative speeds between article and web, it is possible to lengthen out an indicium from its original configuration to a final placement on an article that is as much as four times or more its original size. Thus, it can be seen that a relatively long indicium when in place on a finished article can be manufactured initially in a comparatively minimal size and affixed to a minimal length of web. Thus, it is possible thereby to achieve great savings in costs of material required for making indicia and webs. This factor is especially important when one considers that a web after releasing its indicia is thrown away or otherwise disposed of.

After the decal is applied to the article, photo cell 28 senses a first predisposed mark located on the web and causes an electrically timed delay that stops both motor 36 and motor 38. At the same time, the circuitry resets the timing mechanism and deenergizes the pressure cylinder and the hydraulic control valve 34. The circuitry is then effective to permit movement of the web until photo cell 26 senses a second predisposed mark located on the web and causes the brake 23 to be energized and at the same time stop the motor 38.

After the transfer of an indicium to an article is complete, the pressure rollers retract, rotation of the mandrel is stopped and caused to collapse for release of the article from the mandrel. This completes a full operative cycle and the machine is then ready to begin a new cycle of operation by having an operator place on the machine a subsequent article and apply thereto the next consecutive decal.

To illustrate the manner in which sufficient savings are realized in costs of decal manufacturing, the following tables are presented:

TABLE 1

| | | | | | | |
|---|---|---|---|---|---|---|
| 3" Diameter Mug (3" Decal Height) | | | | | | |
| Size | 8.00" | 5.5" | 3.9" | 2.9" | 2.25" | 1.75" |
| Ratio | 1 | 1.45 | 2.1 | 2.8 | 3.6 | 4.6 |
| Cost | 100% | 67% | 50% | 40% | 33% | 29% |
| Size | 1 7/16" | 1⅛" | 15/16" | | | |
| Ratio | 5.6 | 7.1 | 8.5 | | | |
| Cost | 25% | 22% | 20% | | | |
| 6" Diameter Pot (2" Decal Height) | | | | | | |
| Size | 18½" | 8¾" | 5½" | 3.9" | 2/9" | |
| Ratio | 1 | 2.1 | 3.4 | 4.7 | 6.4 | |
| Cost | 100% | 50% | 33% | 25% | 20% | |
| 12" Diameter Pot (1 1/2" Decal Height) | | | | | | |
| Size | 36" | 18½" | 8¾" | 5½" | 3.9" | |
| Ratio | 1 | 2 | 4.1 | 6.5 | 9.2 | |
| Cost | 100% | 50% | 25% | 17% | 12½% | |

TABLE 2

| | | | New Apparatus & Method | |
|---|---|---|---|---|
| | Hand Applied | Machine Applied 2 Persons | 100% Elongation (2½ × 4) | 200% Elongation (2½ × 2) |
| Decal Cost 2½" × 8" | $0.15 | $0.15 | $0.075 | $0.050 |
| Labor Cost $12/Hr. | 0.12 | 0.024 | 0.024 | 0.024 |
| Total Cost | $.27 | $.174 | $.099 | $.074 |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. Apparatus for transferring indicia from a web to an article, the web including a series of substantially regularly spaced indicia and the article being of any varietal shape, a length of the indicia being substantially less than a length of an exteriorly developed surface of the article, comprising holding means for fixedly supporting the article and adaptable to move the article at a preselected speed, means to move the web at a speed slower than said preselected speed of the article, means for causing said web to move into frictional engagement with said article and cause a one of said indicia to be heated to a plastic condition and be permanently transferred from said web to said article, whereby contact between said indicium and said article is at differing relative speeds and is effective to place said indicium into a plastic condition and assume a greater length substantially equal to an exterior rectilinearly developed length of the article upon being transferred thereto, said one of said indicia upon being transferred to said article being changed from a minimal to an optimal preselected size and shape.

2. Apparatus as claimed in claim 1 wherein said holding means is a mandrel for rotating the article at a preselected angular speed.

3. Apparatus as claimed in claim 1 wherein said holding means supports the article for movement at a preselected linear speed.

4. Apparatus as claimed in claim 1 wherein said means for causing frictional engagement between said article and said one of said indicia comprises index means for moving the web into position so that said one of said indicia is adjacent the article.

5. Apparatus as claimed in claim 4 wherein said means for moving the web at a speed slower than said preselected speed of the article comprises variable speed motor means.

6. Apparatus as claimed in claim 1 wherein said means for causing frictional engagement between said article and said one of said indicia comprises brake means for selectively retaining said web in a preselected position, pressure means for moving said web into contact with said article, start means for activating said pressure means, timing means for selectively maintaining said contact between the web and the article, said timing means simultaneously releasing said brake means to permit respective lineal movement between the web and the article, and sensing means for stopping said lineal movement between the web and the article.

7. Apparatus as claimed in claim 6 wherein said sensing means comprises a plurality of photo cells effective to locate first and second marks on the web for properly positioning said indicia for consecutive transferral to a subsequent article.

8. Apparatus as claimed in claim 1 wherein said means for causing frictional engagement between said article and said one of said indicia comprises means for pre-heating said indicia into a semi-liquid condition.

9. Apparatus for transferring an indicium from a web to an article, the web including a series of substantially regularly spaced indicia and the article being of any varietal shape, a length of each indicium being substantially less than a length of an exterior rectilinearly developed surface of the article, holding means for fixedly supporting the article and adaptable to move the article at a preselected speed, index means for moving the web to a position so that an indicium is adjacent the article, pressure means for moving said indicium into contact with the article, motor means for moving the web at a speed slower than said preselected speed of the article, whereby contact between said indicium and said article at different relative speeds is effective to place said indicium into a plastic condition and assume a greater length substantially equal to an exterior rectilinearly developed length of the article upon being transferred thereto.

10. Apparatus as claimed in claim 9 wherein said holding means is a mandrel for rotating the article at a preselected angular speed.

11. Apparatus as claimed in claim 9 wherein said holding means supports the article for movement at a preselected linear speed.

12. Apparatus as claimed in claim 9 wherein said means for moving the web at a speed slower than said preselected speed of the article comprises variable speed motor means.

13. Apparatus as claimed in claim 9 wherein said index means comprises brake means for selectively retaining said web in a preselected position, start means for activating said pressure means, timing means for selectively maintaining contact between the web and the article, said timing means simultaneously releasing said brake means to permit respective lineal movement between the web and the article, and sensing means for stopping said lineal movement between the web and the article.

14. Apparatus as claimed in claim 13 wherein said sensing means comprises a plurality of photo cells effective to locate first and second marks on the web for properly positioning a series of said indicium for consecutive transferral to a subsequent article.

15. Apparatus as claimed in claim 9 wherein said means for causing frictional engagement between said article and said indicium comprises means for preheating said indicium into a semi-liquid condition.

* * * * *